US008433692B2

(12) United States Patent
Jain et al.

(10) Patent No.: US 8,433,692 B2
(45) Date of Patent: Apr. 30, 2013

(54) EFFECTIVE DATING FOR ENTITY ATTRIBUTES AND RELATIONSHIPS

(75) Inventors: Lalit Jain, San Jose, CA (US); Lovelesh Gupta, Bangalore (IN); Ganesh Shivaprakash, Bangalore (IN); Rabicmeeran Kathermytheen, Bangalore (IN); Bowen Wang, Fremont, CA (US); Peter Tung, Redwood Shores, CA (US); Anil Billapati, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 12/848,372

(22) Filed: Aug. 2, 2010

(65) Prior Publication Data

US 2012/0030258 A1 Feb. 2, 2012

(51) Int. Cl.
 *G06F 17/30* (2006.01)
(52) U.S. Cl.
 USPC .......................................... 707/695; 707/703
(58) Field of Classification Search .................. 707/695, 707/703
 See application file for complete search history.

(56) References Cited

U.S. PATENT DOCUMENTS

| 2006/0085456 | A1* | 4/2006 | Pickering ...................... 707/100 |
| 2007/0130226 | A1* | 6/2007 | Banerjee et al. .............. 707/204 |
| 2008/0120309 | A1* | 5/2008 | Copeland ...................... 707/100 |
| 2009/0248727 | A1* | 10/2009 | Hughes .......................... 707/101 |
| 2011/0320419 | A1* | 12/2011 | Johnston et al. .............. 707/703 |

* cited by examiner

*Primary Examiner* — Khanh Pham
(74) *Attorney, Agent, or Firm* — Campbell Stephenson LLP

(57) ABSTRACT

A method for tracking modifications to tables or relationships. In one embodiment, the method includes updating a first value stored in a first field of a record in a table in response to a database system receiving a first structured query language (SQL) statement from a customer relationship management (CRM) application. A first record is inserted into a history table in response to the first SQL statement, wherein the first record comprises a foreign key field that stores a copy of the primary key of the record, a field that stores a copy of the first value after it is updated, a field that stores a name of the first field, and a first date field. The first date field stores either the date when the first SQL statement was received by the database system, the date of the day that immediately follows the date when the first SQL statement was received by the database system, or a date that was entered into a field of a user interface.

21 Claims, 8 Drawing Sheets

Client_History Table

| Row_ID | Parent_ID | Field_Name | Field_Value | SD | ED |
|---|---|---|---|---|---|
| 4-1 | 0-1 | Citizenship | U.S. | 6/7/10 | |
| 4-2 | 0-1 | Marital_Status | Single | 6/7/10 | 7/7/10 |
| 4-3 | 0-2 | Citizenship | Mexico | 6/8/10 | |
| 4-4 | 0-2 | Marital_Status | Maried | 6/8/10 | |
| 4-5 | 0-1 | Marital_Status | Married | 7/8/10 | |

Income_History Table

| Row_ID | Parent_ID | Field_Name | Field_Value | SD | ED |
|---|---|---|---|---|---|
| 5-1 | 1-1 | Salary | $50k | 6/7/10 | 7/4/10 |
| 5-2 | 1-1 | Title | Attorney | 6/7/10 | |
| 5-3 | 1-1 | Client_ID | 0-1 | 6/7/10 | 7/31/10 |
| 5-4 | 1-2 | Salary | $10k | 6/8/10 | |
| 5-5 | 1-2 | Title | CEO | 6/8/10 | |
| 5-6 | 1-2 | Client_ID | 0-2 | 6/8/10 | |
| 5-7 | 1-3 | Salary | $80k | 6/8/10 | |
| 5-8 | 1-3 | Title | Engineer | 6/8/10 | |
| 5-9 | 1-3 | Client_ID | 0-2 | 6/8/10 | |
| 5-10 | 1-1 | Salary | $60k | 7/5/10 | |

Client_Residence_History Table

| Row_ID | Parent_ID | Field_Name | Field_Value | SD | ED |
|---|---|---|---|---|---|
| 6-1 | 3-1 | Soft_Delete | No | 5/3/05 | 7/7/10 |
| 6-2 | 3-2 | Soft_Delete | No | 1/13/06 | 7/2/10 |
| 6-3 | 3-3 | Soft_Delete | No | 1/13/06 | |
| 6-4 | 3-2 | Soft_Delete | No | 7/10/10 | |

Client Table

| Client_ID | Name | BD | Citizenship | Marital_Status (MS) | Insert_Date (IS) |
|---|---|---|---|---|---|
| 0-1 | PSM | 10/27/68 | U.S.→Mexico | M | 12/1/70 |
| 0-2 | EAS | 12/26/65 | Canada | M | 12/8/65 |
| 0-3 | RMS | 6/11/84 | U.S. | S | 6/7/81 |
| ⋮ | ⋮ | ⋮ | ⋮ | ⋮ | ⋮ |
| 0-m | SDR | 8/12/92 | France | S | 1/15/80 |

*FIG. 2*

| Row_ID | Client_ID | Name | BD | Citizenship | MS | IS | End_Date |
|---|---|---|---|---|---|---|---|
| 1-1 | 0-1 | PSM | 10/27/68 | U.S | M | 12/1/70 | 7/7/10 |

*FIG. 3*

Client Table

| Row_ID | Name | BD | Citizenship | Marital_Status (MS) |
|---|---|---|---|---|
| 0-1 | RMS | 8/22/83 | U.S. | Single→Married |
| 0-2 | RDS | 6/11/93 | Mexico | Married |

Income Table

| Row_ID | Client_ID | Employer | Salary | Title | Soft_Delete |
|---|---|---|---|---|---|
| 1-1 | 0-1 | Oracle | $50k→$60k | Attorney | No→Yes |
| 1-2 | 0-2 | Apple | $10k | CEO | No |
| 1-3 | 0-2 | Google | $80k | Engineer | No |

Residence Table

| Row_ID | Address | City | State |
|---|---|---|---|
| 2-1 | 2312 Aldworth | Oxford | Ohio |
| 2-2 | 1805 Coral | Cleveland | Texas |
| 2-3 | 805 Hollywood | Austin | Texas |
| 2-4 | 1006 West 38th | Nevis | Utah |

Client_Residence Table

| Row_ID | Client_ID | Residence_ID | Soft_Delete |
|---|---|---|---|
| 3-1 | 0-1 | 2-1 | No→Yes |
| 3-2 | 0-2 | 2-1 | No→Yes→No |
| 3-3 | 0-2 | 2-4 | No |

*FIG. 5*

Client_History Table

| Row_ID | Parent_ID | Field_Name | Field_Value | SD | ED |
|---|---|---|---|---|---|
| 4-1 | 0-1 | Citizenship | U.S. | 6/7/10 | |
| 4-2 | 0-1 | Marital_Status | Single | 6/7/10 | 7/7/10 |
| 4-3 | 0-2 | Citizenship | Mexico | 6/8/10 | |
| 4-4 | 0-2 | Marital_Status | Maried | 6/8/10 | |
| 4-5 | 0-1 | Marital_Status | Married | 7/8/10 | |

Income_History Table

| Row_ID | Parent_ID | Field_Name | Field_Value | SD | ED |
|---|---|---|---|---|---|
| 5-1 | 1-1 | Salary | $50k | 6/7/10 | 7/4/10 |
| 5-2 | 1-1 | Title | Attorney | 6/7/10 | |
| 5-3 | 1-1 | Client_ID | 0-1 | 6/7/10 | 7/31/10 |
| 5-4 | 1-2 | Salary | $10k | 6/8/10 | |
| 5-5 | 1-2 | Title | CEO | 6/8/10 | |
| 5-6 | 1-2 | Client_ID | 0-2 | 6/8/10 | |
| 5-7 | 1-3 | Salary | $80k | 6/8/10 | |
| 5-8 | 1-3 | Title | Engineer | 6/8/10 | |
| 5-9 | 1-3 | Client_ID | 0-2 | 6/8/10 | |
| 5-10 | 1-1 | Salary | $60k | 7/5/10 | |

Client_Residence_History Table

| Row_ID | Parent_ID | Field_Name | Field_Value | SD | ED |
|---|---|---|---|---|---|
| 6-1 | 3-1 | Soft_Delete | No | 5/3/05 | 7/7/10 |
| 6-2 | 3-2 | Soft_Delete | No | 1/13/06 | 7/2/10 |
| 6-3 | 3-3 | Soft_Delete | No | 1/13/06 | |
| 6-4 | 3-2 | Soft_Delete | No | 7/10/10 | |

*FIG. 6*

EFFECTIVE DATING FOR ENTITY ATTRIBUTES AND RELATIONSHIPS

BACKGROUND OF THE INVENTION

Enterprise applications like customer relationship management (CRM) applications manage information stored in relational databases. Users of enterprise applications, such as management, salespeople, people providing customer service, customers, etc., modify information managed by the applications. The present invention will be described with reference to CRM applications, it being understood the present invention should not be limited thereto.

In a relational database, information is typically stored in tables, which can be seen as two-dimensional structures of columns and rows. In more traditional computer terminology, the columns are called fields and the rows are called records. Each record of a table represents one object (e.g., a person), event, or relationship. All records within a table represent the same type of object. Tables in a relational database may contain hundreds or thousands of records.

A field in a record contains one value of particular type of information. A field should not contain one type of information for one record in a table and another type of information for another record in the same table. Each field has a name and an information type. Essentially, there are three main information types: text, numbers, and dates. Some fields allow nulls, which are unknown values. Other fields do not allow them. If a field does not allow nulls, then a value is usually required in the field for every record of the table.

Each field has a position within the table. That is, the fields are an ordered set. This contrasts with records, which have no fixed order. Information about the fields—their names, information types, positions, and whether they accept nulls—is all considered to be part of the definition of the table itself. In contrast, information about the records is considered to be part of the data and not part of the definition of the table.

Primary and foreign keys are important components in relational database tables. Most tables in relational databases contain a primary key that uniquely identifies each row or record. Each row must have its own identity, so no two rows are allowed to have the same primary key. Foreign keys are contained in a column of a child table and reference primary keys in a parent table. A primary key in a parent table can be referenced in many child table records. This is called a one-to-many (1:M) relationship. Many-to-many (M:M) relationships may also occur in relational databases. Each record in a pair of tables can relate to a number of records in the other table. M:M relationships require a third table, known as an intersection table, because relational databases can't directly accommodate the M;M relationship.

Structured query language (SQL) is a computer language designed to access information stored in relational databases. Enterprise applications such as CRM can generate SQL statements for accessing information in tables. The select statement or command can used to retrieve information from a table. The basic select statement has four clauses that include: the select clause, which identifies which columns are sought; the from clause, which identifies a table that contains the data sought; the where clause, which identifies the rows sought; and the order by clause, which identifies how to sort the final result. The results of a select statement are typically returned in a result table, which has columns and rows, and which can be displayed on a monitor of, for example, a client computer system that is in data communication with a database system via an enterprise application.

Tables can be modified by adding new records, updating values in one or more fields of existing records, or deleting records entirely. Records can be added to a table using an insert statement, which typically begins with insert into, followed by the name of the table. The insert statement typically has the word values followed by a list of values to be inserted into respective fields of the new record. The value put into any field of a record must always match the information type of that field: text, number, or date. Values within one or more columns of a table can be modified using the update statement. The syntax of update statements is typically easier to read and work with when compared to the insert statement. In update statements, the name of the field is aligned with its new value. A record in a table may be removed using the delete statement. As will be more fully described below, a record can be "soft deleted" via an update statement. A soft deleted record is not really removed from the database. Rather, the soft deleted record appears to have been removed from the database.

BRIEF DESCRIPTION OF THE DRAWINGS

The present invention may be better understood, and its numerous objects, features, and advantages made apparent to those skilled in the art by referencing the accompanying drawings.

FIG. 2 graphically illustrates an example base table stored in the relational database system of FIG. 1.

FIG. 3 graphically illustrates an example history table stored in the relational database system of FIG. 1.

FIG. 5 graphically illustrates example base tables stored in the relational database system of FIG. 4.

FIG. 6 graphically illustrates example history tables stored in the relational database system of FIG. 4.

The use of the same reference symbols in different drawings indicates similar or identical items.

DETAILED DESCRIPTION

As noted, CRM applications manage information stored in relational databases. CRM applications designed for social service agencies, for example, manage information about clients such as their date of birth, marital status, number of dependents, home address, etc. In addition to managing information, CRM applications used by social service agencies can perform operations such as calculating benefits that are currently owed to a client based on information such as marital status, number of dependents, income, etc.

CRM application users update information (e.g., marital status, number or dependents, etc.) stored in a relational database. Some entities such as social service agencies are required to maintain a history of these updates. To meet this requirement, CRM applications can make copies of records before they are updated. The copies can be stored in the database and later retrieved by the CRM application, for example, to calculate benefits for a client that existed or should have existed at a prior point-in-time.

Figure 1:
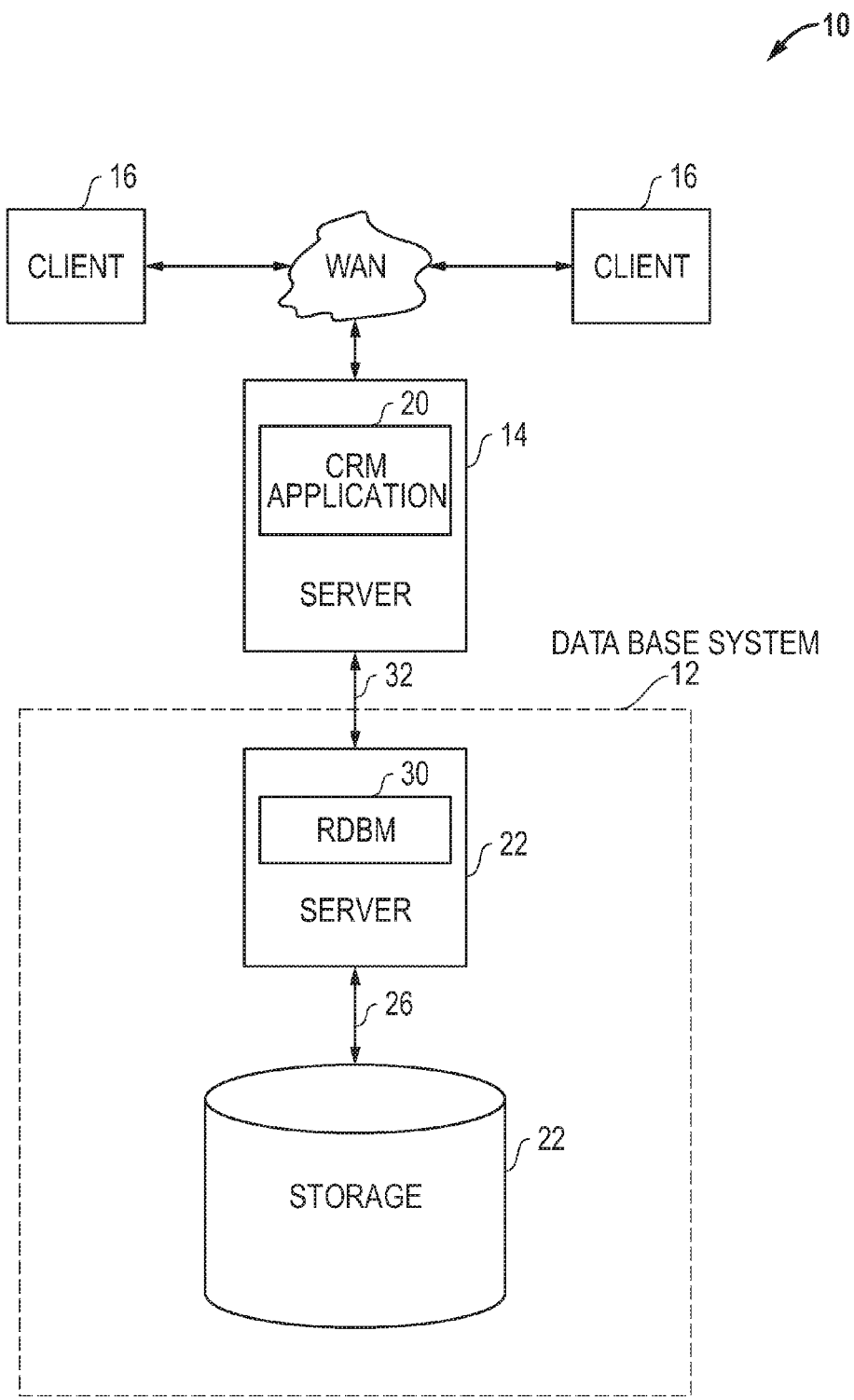
FIG. 1 graphically illustrates relevant components of an example system that employs a relational database system.

FIG. 1 illustrates in block diagram form relevant components of a system 10 in which records of a relational database can be copied before they are updated. As shown in FIG. 1, system 10 includes a relational database system 12 coupled to a computer system (e.g., a server) via a communication link. Server 14 is coupled to additional computer systems (e.g., client computer systems) 16 via a wide area network (WAN) such as the Internet. A CRM application 20 executes on one or more processors of server 14 and is in data communication with client computer systems 16 via browsers (e.g., Internet Explorer) executing thereon.

Users can view or update information in the relational database system 12 via GUIs implemented on client computer systems 16. CRM application 20 is configured to receive and process transactions from client computer systems 16, which in turn were generated in response to user input to the GUIs. Client computer systems 16 are also configured to receive and display results of transactions that were processed by CRM application 20. In response to some transactions received from client computer systems 16, CRM application 20 generates SQL statements for accessing records of database system 12. The results of implementing some SQL statements can be returned to CRM application 20 for subsequent processing.

Database system 12 includes a computer system (e.g., server) 22 coupled to a storage subsystem 24 via communication link 26. Storage subsystem 24 may take form in one or more devices such as disk arrays. Communication link 26 may take form in a storage area network (SAN) that includes several components such as bridges, routers, switches, etc. Database server 22 may include a relational database manager (RDBM) 30 that may take form in software instructions executing on one or more processors of server 22. Database manager 30 is configured to receive and implement SQL statements generated by CRM application 20. Moreover, database manager 30 is configured to return results of implemented SQL statements to CRM application 20.

Database system 12 stores one or more base tables. For purposes of explanation, base tables store records of currently effective information. History tables, also stored in database system 12, can store copies of records from a base table. In other words, history tables can store copies of records that were currently effective in base tables at prior point-in-time. History tables can be considered children to their parent base tables.

FIG. 2 is a graphical representation of an example base table named "Client" that may be contained within database system 12. The Client table includes m records, each of which has several fields including; Client_ID, Name, Birth Date (BD), Citizenship, Marital_Status, and Insert_Date. Client_ID is the primary key field for each record. The Client_ID, Name, Birth Date (BD), Citizenship, and Marital_Status, Client_ID records store currently effective values about a client. The Insert_Date stores the date when the record was inserted into the Client table.

CRM application 20 is configured to generate SQL statements in response to receiving transactions generated by client computer systems 16. These SQL statements, when implemented by database manager 30, can result in the retrieval of values from tables such as Client shown in FIG. 2, or the SQL statements, when implemented, may result in updates to table values.

CRM application 20 can track updates to tables on the record level. More particularly, CRM application can track changes to one or more values in a record by creating a copy of the record before any value thereof is updated in accordance with, for example, an update statement generated by CRM application 20. The copy of the record, once created, is inserted into a history table along with a time period (e.g., date range) that indicates when the copied record was currently effective in the base table. To illustrate, in response to receiving a transaction generated by client computer system 16, CRM application 20 generates a SQL statement to update "U.S." to "Mexico" in the Citizenship field of the illustrated first record (i.e., Client_ID=0-1) in the Client table. Before the Citizenship field value is updated, however, CRM application 20 may create a copy of the first record and subsequently generate a SQL statement for inserting the copy into a history table along with other information. FIG. 3 illustrates a graphical representation of an example history table into which the copy of first record is inserted.

Records in the history table shown in FIG. 3 should include the same fields as the records from the parent base table. In addition, the history records of FIG. 3 should include a primary key field (e.g., Row_ID) along with End-Date field. The End_Date field value may be set to the date the history record was inserted into the history table. The combination of the Insert_Date field and the End_Date field define a period when contents of the history record were currently effective in the parent base table. After a copy of a record from the Client table is inserted into the history table, database manager 30 implements the example SQL statement that updates the Citizenship field by changing "U.S." to "Mexico."

History records are essentially snapshot copies or copies of records as they existed in parent base tables at prior point-in-times. A snapshot copy can be retrieved using select statements generated by CRM application 20. The retrieved snapshot copy can be subsequently processed by CRM application 20, for example, to calculate social benefits that were applicable for a client at a prior point-in-time.

Importantly, CRM application 20 tracks changes to a record by inserting a copy of the entire record to a history table before the record is updated, regardless of whether only one field of the record is to be updated, and regardless of the field that is to be updated. While this approach makes it easy to query a history table for a snapshot copy of a record as it existed at a prior point-in-time, the approach suffers from several disadvantages. For example, a change to even one field of the record in the parent base table requires inserting a copy of the entire record into a history table, which can lead to data redundancy and increased storage demands on storage subsystem 24. Additionally, the field sought to be updated may be irrelevant to operations or calculations performed by CRM application 20, but CRM will insert a copy of the record into the history table before the irrelevant field value is updated.

Figure 4:
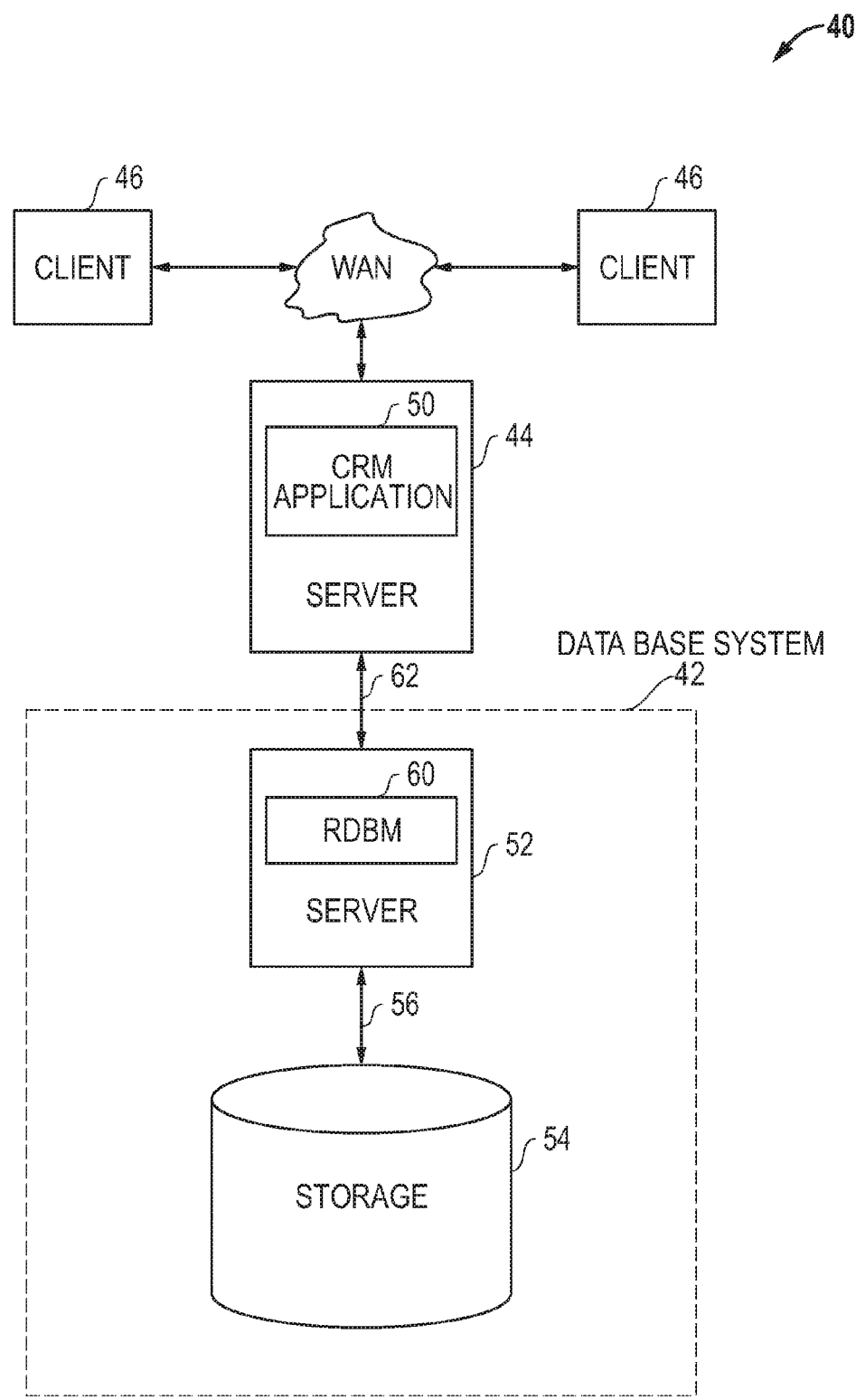
FIG. 4 graphically illustrates relevant components of another example system that employs a relational database system.

FIG. 4 illustrates an alternative system 40, shown in block diagram form, in which table modification (e.g., inserting new records or updating values in existing records) can be tracked at the field level. The system 40 shown in FIG. 4 can preserve prior values of record fields, which in turn can be later used to create snapshot copies or copies of records as they existed at a prior point-in-time. Further, alternative system 40 is capable of tracking changes to relationships between records of base tables, which is a feature that is lacking in the system shown in FIG. 1.

System 40 includes a relational database system 42 in data communication with a computer system (e.g., server) 44 via a communication link. Computer systems (e.g., client computer systems) 46 are also in data communication with server 44 via a WAN such as the Internet. Server 44 implements a CRM application 50 which may take form in software instructions executing on one or more processors of server 44. Although not shown, these software instructions can be stored within a computer readable memory of server 44.

CRM application 50 is in data communication with client computer system 46 via a browser (e.g., Internet Explorer) executing thereon. Users can view or update information in the relational database system 42 via GUIs implemented on client computer systems 46. CRM application 50 is configured to receive and process transactions from client computer systems 46, which in turn were generated in response to user input to the GUIs. Client computer systems 46 are configured to receive and display results of transactions that were processed by CRM application 50.

In response to receiving transactions generated by client computer systems 46, CRM application 50 may generate one or more SQL statements for accessing tables of database system 42. These SQL statements, when implemented, can result in the retrieval of information from tables in database system 42, or the SQL statements, when implemented, may result in modification of tables in database system 42. Results of some SQL statements, such as select statements, that are implemented by database system 42 can be returned to CRM application 50 for subsequent processing.

Database system 42 includes a computer system (server) 52 in data communication with a storage subsystem 54 via communication link 56. Storage subsystem 54, like storage subsystem 24 shown in FIG. 1, may include one or more storage devices such as disk arrays that store database tables including base tables and history tables. Communication link 56, like communication link 26 shown within FIG. 1, may include one or more components such as bridges, routers, switches, etc. Server 52 may include a relational database manager 60 that may take form in software instructions executing on one or more processors of server 52.

History tables are employed by CRM application 50 to preserve field values of base tables, including field values that identify a relationship or lack thereof between records. In other words history tables are employed by CRM application 50 to track updates to values in respective base tables. In response to transactional requests received from a client computer system 46, CRM application 50 can retrieve one or more records from a history table and subsequently process their contents to create a snapshot copy of a record as it existed at a prior point-in-time in a base table. Once CRM application 50 creates the snapshot, CRM application 50 can calculate, for example, social benefits that were owed or should been owed to a client at the prior point-in-time, or CRM application 50 can send values of the snapshot copy to client computer system 46 for display in a GUI.

FIG. 5 graphically illustrates example base tables, which can be stored within relational database system 42, and which are accessible via SQL statements generated by CRM application 50. Each of these tables contains multiple records, each having multiple fields that store values such as those used by a social service agency to calculate benefits. Records in some of the example base tables have a relationship with records in other tables. For example, records in the "Client" table may have a 1:M relationship with records in the "Income" table. The "Client_Residence" is an intersection table enables an M:M relationship between records of the Client table and the "Residence" table.

Records of the Income table and the Client_Residence intersection table include a Soft_Delete field, the value of which is set to a binary state of either YES or NO. The Soft_Delete field provides the ability to soft-delete a record. When a record is soft deleted, the record is not literally deleted from the table, but appears to be deleted to an end user, e.g., a user of client computer system 46. Thus, when the Soft_Delete field of a record is set to "YES," the record does not appear to exist in the database system 42, but still remains in memory thereof. If the Soft_Delete field is updated from YES to NO, the record once again appears available for access. The value of the Soft_Delete field may affect the relationship between records; if a record is soft deleted, it no longer has a relationship with another record.

CRM application 50 can track updates to values of one or more columns in a table that are selectively designated by a system administrator. CRM application 50 can also track changes to relationships that have been selectively designated by the system administrator. Tracking changes to values or relationships may also be referred herein as effectively dating values or relationships.

A system administrator can selectively designate one or more columns or fields within a base table (e.g., Client, Income, or Client_Residence tables shown in FIG. 5) for update tracking using a GUI (not shown). A system administrator can also use the GUI to selectively designate relationships between records for update tracking. The identity of the selected columns or fields can be stored in a data object (e.g., look-up table, not shown), referenced herein as the tracking data object TDO, which is accessed by CRM application 50 when CRM application, for example, generates a SQL statement to insert a new record into a base table or to update one or more values in an existing record of a base table. Ultimately, CRM application 50 uses the tracking data object TDO to determine the values in base tables that should be copied to history tables, before or after the base tables are modified. The identity of relationships designated for tracking may also be stored in the tracking data object TDO For purposes of explanation, only the Citizenship and Marital_Status field of the example Client table are designated for tracking in the tracking data object TDO. The Salary and Title fields of the example Income table are designated for tracking in the tracking data object TDO. The 1:M relationships between records of the example Client and Income tables will be designated as tracked in the tracking data object TDO, and the M:M relationships between records of the Income and Residence tables as enabled by the Client_Residence intersection table, are designated as tracked in the tracking data object TDO. In one embodiment, Soft_Delete fields can be designated in the tracking data object TDO for the purpose of tracking relationships between records.

Base tables such as those shown in FIG. 5 store currently effective information. In one embodiment, history tables such as those shown in FIG. 6 can store copies of field values as they existed in respective base tables at prior points-in-time. In other words, the history tables employed by CRM application 50 can store field values that were effective at prior points-in-time. With continuing reference to FIGS. 5 and 6, Client_History, Income_History, and Client_Residence_History are example history tables for the Client, Income, and Client_Residence base tables, respectively. Each of the history tables shown in FIG. 6 is a 1:M child extension table for a respective base table.

Each history record should capture one and only one field value of a parent record before the parent record is updated in accordance with a SQL statement generated by CRM application 50. In the example embodiment shown in FIG. 6, each history record includes: a Row_ID field that stores the history record's primary key; a foreign key field named Parent_ID that stores the primary key of a corresponding parent record; a Field_Name field that stores the name of a field from the corresponding parent record; a Field_Value field that stores a copy of a field value from the field that is identified in the Field_Name field, and; date fields (Start_Date and End_Date fields), which together define a time period during which the value in the Field_Value field was current or effective in the parent record. In one embodiment, when a history record is first inserted into a history table, the End-Date field should be empty or set to null. The values within the Parent_ID, Field_Name and date fields enable CRM application to query the history tables for records that can be used to recreate a record as it existed in a base table at a prior point-in-time.

Figure 7:
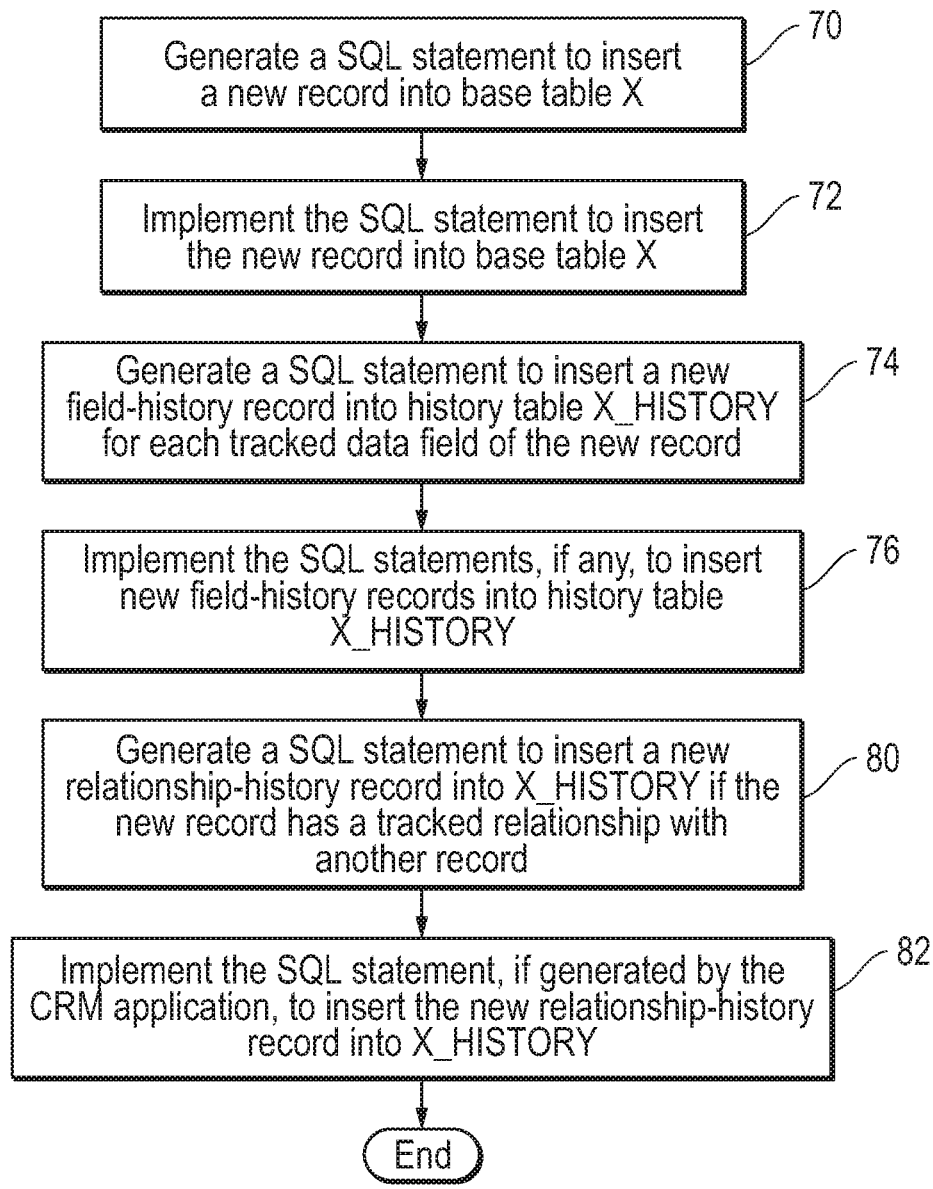
FIG. 7 illustrates relevant aspects of a process implemented by the system shown in FIG. 4.

The system shown in FIG. 4 is configured to implement a process for tracking modifications (e.g., adding new records and/or updating values of existing records). In one embodiment, this process may include copying one or more values from a new record into respective history records before the new record is inserted into a base table or immediately after it is inserted in a base table. FIG. 7 is a flow chart showing relevant aspects of an example process implemented in the system of FIG. 4 when a new record is inserted into a base table. The process in FIG. 7 begins when CRM application 50 generates a SQL statement to insert a new record into a base table X in response to, for example, receiving a transaction generated by client computer system 46. This insert statement is transmitted to database manager 60 via communication link 62 for implementation. Database manager 60 implements the insert statement by inserting the new record into base table X as shown in step 72. Also in response to generating the insert statement in step 70, CRM application 50 accesses the tracking data object TDO mentioned above to determine whether any fields of the newly inserted record are designated as tracked, or if the newly inserted record has a tracked relationship with another record. CRM application 50 generates a SQL statement to insert a new field-history record into history table X_History for each tracked field of the newly inserted record, as shown in step 74. The one or more SQL insert statements of step 74, which respectively include one or more tracked field values from the newly inserted record, are subsequently transmitted to database manager 64 for implementation. Likewise, if CRM application 50 determines that the newly inserted record has a tracked relationship, CRM application 50 generates a SQL statement to insert a new relationship-history record into X_History, as shown in step 80. The SQL statement generated in step 80 is transmitted and subsequently implemented by database manager 60, as shown in step 82.

To partially illustrate the process in FIG. 7, suppose CRM application 50 generates a SQL statement to insert new record 1-3 (shown in FIG. 5 as inserted) into the Income table in response to receiving a transaction that includes values of the new record that were entered into fields of a user interface displayed on client 46. The Salary and Title fields of the Income table are designated as tracked within the tracking data object TDO. The newly inserted record 1-3 has a child relationship with record 0-2 in the Client table. The 1:M relationship between records of the Client and Income tables of FIG. 5 is designated as tracked in the tracking data object TDO. In accordance with step 74 of FIG. 7, CRM application 50 will generate separate SQL statements to insert two new field-history records 5-7 and 5-8 (shown in FIG. 6 as already inserted) into Income_History table, and these two field-history records contain respective copies of the field values "$80,000" and "Engineer" from the tracked Salary and Title fields of newly inserted parent record 1-3. New field-history records 5-7 and 5-8 will also contain the field names "Salary" and "Title" of the parent record 1-3 in their respective Field-Name fields. The Parent_ID fields of the new field-history records 5-7 and 5-8 will contain "1-3," the primary key of their parent. The newly inserted field-history records will also initially include a Start_Date field set to the date that the parent record 1-3 was inserted into the corresponding base table, if a start date has not been entered into a corresponding field of client 46's user interface mentioned above. If the transaction received by CRM application 50 includes a user entered start date, the Start_Date filed will store that user entered start date. Alternatively, the Start_Date field may initially include the date that immediately precedes or proceeds the day the parent record was inserted into the corresponding base table, if a start date has not been entered into a corresponding field of client 46's user interface. In one embodiment, the The End_Date field of each newly inserted field-history records is initially left empty or set to null.

Newly inserted record 1-3 has a relationship with record 0-2 from the Client table. Because the 1:M relationship between records of the Client and Income tables are designated as tracked in this example, CRM application 50 generates a SQL command to insert a new relationship-history record 5-9 (Shown in FIG. 5) into Income_History in accordance with step 80 of FIG. 7. In one embodiment, a 1:M relationship between records is tracked by storing the primary key and the name of primary key field of the related record (i.e., record 0-2 from the Client table) into the Field_Value and Field_Name fields, respectively of the newly inserted history record. Thus, in the illustrated example, relationship record 5-9 includes "Client_ID" and "0-2" in the Field_Name and Field_Value fields, respectively. In an alternative embodiment, in step 80 CRM application 50 may also generate a second SQL statement to insert a second, new relationship-history record into X_History. This second relationship-history record may include the field name "Soft_Delete" and the Soft_Delete field value of the related record in the Field_Name and Field_Value fields, respectively, if the newly inserted parent record has a Soft_Delete field or an equivalent thereof. All newly inserted relationship-history records should include a Parent_ID field that contains a copy of the primary key of the newly inserted parent record, in addition to a Start_Date field initially set to the date the parent record was inserted into the corresponding base table X and an End_Date field initially left empty or set to null. Alternatively, the Start_Date field may initially include the date that immediately precedes or proceeds the day the parent record was inserted into corresponding base table X.

The record inserted into base table X in accordance with step 70 may define a tracked M:M relationship between records. In this situation, a new relationship-history record is inserted into X-History in accordance with step 80. For example, when record 3-3 was first inserted into the Client_Residence intersection table, CRM application 50 inserted relationship-history record 6-1 into Client_Residence_History since the M:M relationship defined by the Client_Residence intersection table is designated as tracked. In one embodiment, a M:M relationship between records is tracked by storing the value (e.g., "No") of a Soft_Delete field and the name "Soft_Delete" of the parent record (i.e., record 3-1 from the Client_Residence table) into the Field_Value and Field_Name fields, respectively of the newly inserted relationship-history record, if the newly inserted parent record has a Soft_Delete field or an equivalent thereof. In the illustrated example, relationship-history record 6-1 stores "Soft_Delete" and "No" in the Field_Name and Field_Value fields, respectively.

CRM application 50 may generate SQL statements for updating values in records of base tables such as those shown within FIG. 5. One or more of these SQL update statements may be generated by CRM application 50 in response to CRM application 50 receiving a transaction generated by client computer system 46. In one embodiment, if an update statement, when implemented by database manager 60, results in the modification of one or more values in respectively tracked fields of a base table record, the one or more values are copied into respective one or more new field-history records after modification. A SQL statement to update the Soft_Delete field from "NO" to "YES" may also be generated by CRM application 50 in response to CRM application 50 receiving a transaction request generated by client computer system 46 to, in effect, delete a record in a base table. And if this record is one that has a tracked relationship with another record or defines a M:M relationship between records, CRM application may generate a SQL statement to update a corresponding relationship-history record so that it reflects the time period during which the relationship was effective.

Figure 8:
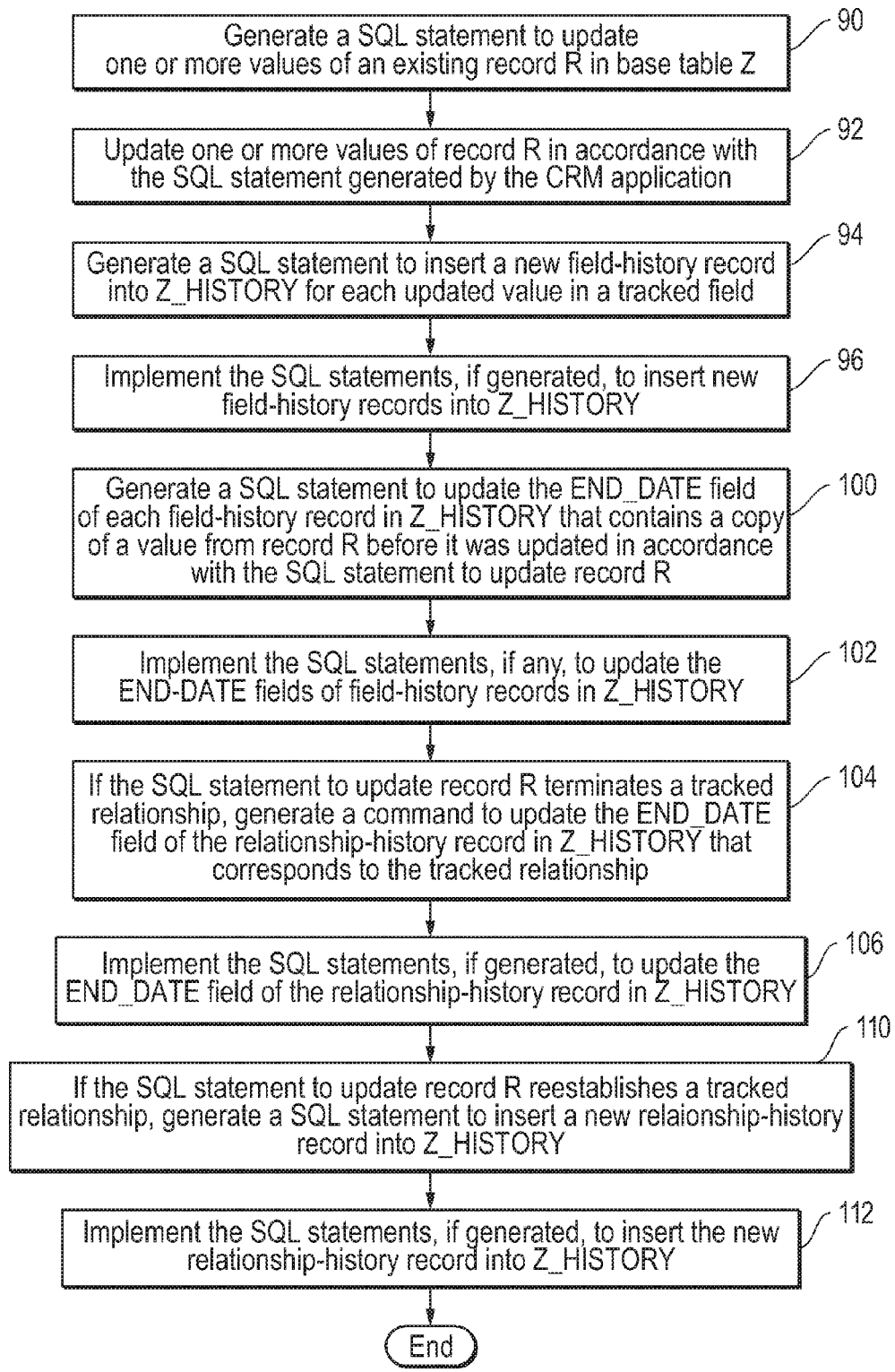
FIG. 8 illustrates relevant aspects of another process implemented by the system shown in FIG. 4.

FIG. 8 is a flow chart illustrating relevant aspects of a process implemented within the system 40 shown in FIG. 4 for tracking updates to data field values in a base table or for tracking changes to relationships between records of base tables. The process in FIG. 8 begins when CRM application 50 generates a SQL statement to update one or more values of one or more fields of an existing record R in base table Z as shown in step 90. The SQL statement could update the value that is contained in a Soft_Delete field of record Z, which in turn could affect a relationship between record Z and another record in another base table, and this update statement could be generated by CRM application 50 in response to CRM application 50 receiving a transaction (such as a transaction that requests the deletion of record R) from client 46.

In step 92, database manager 60 implements the update statement generated by CRM application 50. CRM application 50 accesses the tracking data object TDO to determine whether any updated value is contained in field that is designated as tracked. Further, if a relationship involving record R is updated by, for example, flipping the value of a Soft_Delete field in record R, CRM application 50 also uses the tracking data object TDO to determine if the affected relationship is tracked. If any of the updated values are in fields of record R that are designated as tracked, CRM application 50 generates a respective SQL statement to insert a new field-history record into Z_History as shown in step 94. Each of new insert statements generated in step 94 is transmitted to database manager 60 for implementation, which in turn results in a new field-history record into Z_History. In one embodiment, each new field-history record will include an updated value from the parent record.

To illustrate, presume CRM application 50 generates an SQL statement to update the Salary field in record 1-1 from $50,000 to $60,000. Because this field is designated as tracked, CRM application 50 generates a SQL statement to insert a new field-history record into Income_History. Database manager 60 implements this insert statement by adding record 5-10 (already shown in FIG. 5) into Income_History. This field-history record includes a copy of the updated value "$60,000" and the field name "Salary" from the updated record 1-1. Newly inserted record 5-10 also includes a Start_Date field set to the date when the parent record 1-1 was updated in accordance with the SQL statement generated in step 74. In an alternative embodiment, the Start_Date field of the newly inserted history-record may be set to the date that immediately proceeds or precedes the date the parent record was updated in accordance with the SQL statement generated in step 74.

Returning to FIG. 8, in addition to inserting a new field-history record that contains the updated value from the parent record, CRM application 50 will generate a SQL statement to update the End_Date field of an existing field-history record in Z_History that contains a copy of the old value from parent record R before it was updated in accordance with the SQL statement generated in step 90. To illustrate, the Income-History contains record 5-1, which includes a copy of the old salary "$50,000" of parent record 1-1. Database manager 60 implements a SQL statement generated in step 104 by updating the End_Date field of record 5-1 to the date of the day that is prior to the date when the "$50,000" value of record 1-1 was updated. In an alternative embodiment, the End-Date field can be updated to the date when the value was updated in the parent record R in accordance with step 92.

Returning to FIG. 8, if the SQL statement generated in step 90 and implemented in step 92 affects a tracked relationship such as by soft-deleting a child record or a record in an intersection table, CRM application 50 should generate a SQL statement for tracking this relationship change. More particularly, CRM application 50, as shown in step 104, generates a SQL statement to update the End_Date field of an existing relationship-history record in Z_History that corresponds to soft-deleted child record or the soft-deleted intersection table record, which includes an End_Date field that is empty or set to null. For example, the SQL statement generated in step 90, when implemented, results in a update (i.e., from "NO" to "YES") of the value in the Soft_Delete field of record 1-1. In essence, this is a soft-delete of record 1-1 that is implemented in response to a transaction request from client computer system 46 to, in effect, delete record 1-1. Because the relationship between record 1-1 and its parent 0-1 is designated as tracked, CRM application 50 generates a SQL statement to update the End_Date field of relationship-history record 5-3 in Income_History table, which is relationship-history record for its parent 1-1 that lacks a date in the End_Date field. In the illustrated example, implementing the SQL statement generated in step 104 will result in date entered to the End_Date field of record 5-3.

On the other hand, if the SQL statement implemented in step 92 results in the recreation of the tracked relationship for example by switching the binary state of the Soft_Delete field from "Yes" to "No" in record R, then in step 110 CRM application 50 generates a SQL statement to insert a new relationship-history record into Z_History, which is subsequently implemented by database manager 60, as shown in step 112. Steps 110 and 112 are implemented in a manner that is similar to steps 80 and 82 shown in FIG. 7 and described above.

Updating a tracked 1:M relationship may be processed differently when compared to the process for updating a tracked M:M relationship. When a new 1:M relationship is established, the relationship-history record inserted into the corresponding history table will include a copy of the foreign key of the parent record in addition to name of the foreign key field of the parent record. For example, FIG. 6 shows record 5-3 of the Income_History table, which is a relationship-history record for a tracked 1:M relationship between record 1-1 of the Income table and record 0-1 of the Client table. Here the foreign key 0-1 of the parent record 1-1 is stored in the Field_Value field of the history-record. In contrast, record 6-1 in the Client_Residence_History table is a relationship-history record for an M:M relationship. Here the value of the Soft_Delete field of the parent record, not the foreign key of the parent record, is stored within the Field_Value field, and the name "Soft_Delete" is stored in the Field_Name field.

CRM application 50 is capable of generating a copy of a record S as it existed in a base table Y at a prior point-in-time. CRM application 50 is also capable of generating copies of related records as they existed in tables related to Y at prior points-in-time. The generation of record S (i.e., a snapshot copy) can be initiated in response to CRM application 50 receiving a transaction generated by client computer system 46. The transaction should identify the prior point-in-time. In response to receiving the transaction, CRM application 50 may generate a SQL statement to select all history records from Y_History that are children to parent record S and which have a date in the End-Date field that is later in time than the prior point-in-time and a date in the Start_Date field that is earlier in time than the requested prior point-in-time. Database manager 60 implements the SQL statement to select one or more history records from Y_History, and returns the selected one or more history records to CRM application 50. CRM application 50 may also generate a select statement to retrieve the parent record S as it currently exists in the base table Y. Once the parent record S is returned to CRM application 50, CRM application 50 replaces values of tracked fields of currently existing record S with respective values from the Field_Value fields of the history records that were retrieved from Y_History. For example, to generate a snapshot of record 0-1 as it existed in the Client table on Jun. 30, 2010, CRM application 50 may generate a SQL statement to select one or more history records from Client_History table having: Parent_ID=0-1; an End_Date field value that is later than Jun. 30, 2010 and; a Start_Date field value that is earlier than Jun. 30, 2010. Database manager 60, in response to implementing this select statement, will query the Client_History and return record 4-2. In addition, CRM application 50 may generate an additional SQL statement to select record 0-1 as it currently exists in the Client table. CRM application 50 receives copies of records 4-2 and 0-1 from the database manager 60. In response, CRM application creates the snapshot by replacing the Marital_Status field value in copy of record 0-1 with "Single," which is the Field_Value value from copy of record 4-2.

CRM application may also generate SQL statements to select records in history tables that are related. In the illustrated example, the Income table has a record 1-1 that is a child of record 0-1, and the Residence table has a record 2-1 that is related to record 0-1 via record 3-1 of the Client_Residence table. Because of these two relationships, CRM application may generate a SQL statement to select one or more records from the Income_History table having Parent_ID=1-1; an End_Date field value that is later than Jun. 30, 2010 and; a Start_Date field value that is earlier than Jun. 30, 2010, and CRM application 50 may generate a SQL statement to select a record from the Client_Residence_History table having Parent_ID=3-1; an End_Date field value that is later than Jun. 30, 2010 and; a Start_Date field value that is earlier than Jun. 30, 2010. Database manager 60 in response to implementing these additional select statements should return record 5-1 from the Income_History table and record 6-1 from the Client_Residence_History table. History records 5-1 and 6-1 can be used in the creation of copies of parent records 1-1 and 3-1 for as they existed on Jun. 30, 2010. For example, the snapshot for record 1-1 would be created by replacing the "$60K" in the Salary field of a copy of record 1-1 as it exists in the Income table with "$50" from the retrieved field-history record 5-1, and the snapshot record 3-1 would be created by replacing the "Yes" in the Soft_Delete field of a copy of record 3-1 as it exists in the Client_Residence table with "No" from the retrieved relationship-history record 3-1.

In addition to tracking changes to records of the base tables such as those shown in FIG. 5, CRM application 50 may generate a SQL statement to update values contained within records of the history tables to, for example, correct effective dates or time periods defined by the Start_Date and End_Date fields. To illustrate, a user of client computer system 46 may seek to change the Start_Date or and End_Date of a record contained within a history table. In response to CRM application 50 receiving this transaction request, CRM application 50 may generate a SQL statement to update the record in the history table.

Figure 9:
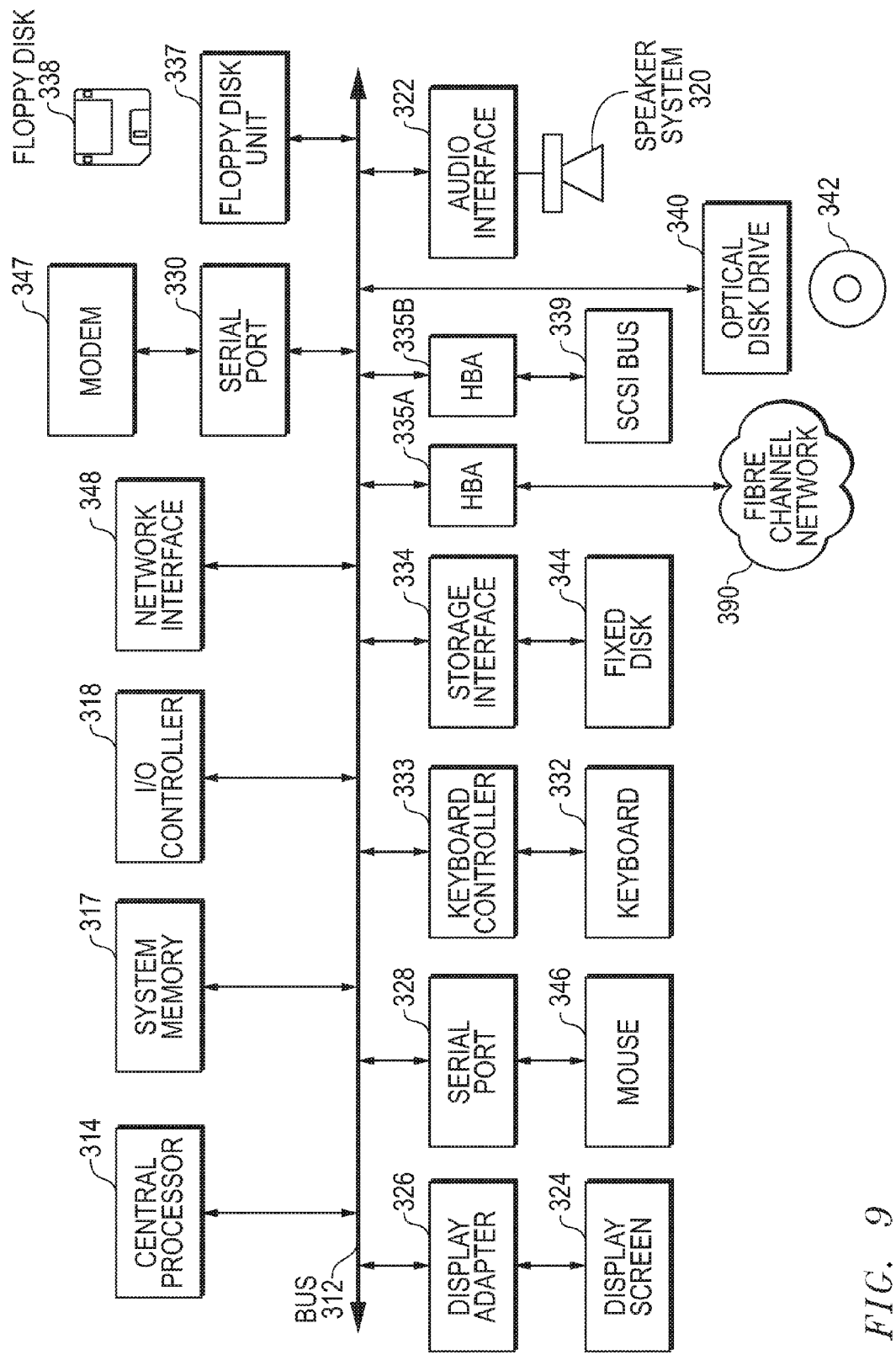
FIG. 9 is a block diagram of an example computer system that may be employed in the system of FIG. 1 or 4.

FIG. 9 depicts a block diagram of a computer system 310 suitable for implementing the present disclosure. Computer system 310 may be illustrative of various computer systems (e.g., servers or clients) shown in FIGS. 1 and 4. Computer system 310 includes a bus 312 which interconnects major subsystems of computer system 310, such as a central processor 314, a system memory 317 (typically RAM, but which may also include ROM, flash RAM, or the like), an input/output controller 318, an external audio device, such as a speaker system 320 via an audio output interface 322, an external device, such as a display screen 324 via display adapter 326, serial ports 328 and 330, a keyboard 332 (interfaced with a keyboard controller 333), a storage interface 334, a floppy disk drive 337 operative to receive a floppy disk 338, a host bus adapter (HBA) interface card 335A operative to connect with a Fibre Channel network 390, a host bus adapter (HBA) interface card 335B operative to connect to a SCSI bus 339, and an optical disk drive 340 operative to receive an optical disk 342. Also included are a mouse 346 (or other point-and-click device, coupled to bus 312 via serial port 328), a modem 347 (coupled to bus 312 via serial port 330), and a network interface 348 (coupled directly to bus 312).

Bus 312 allows data communication between central processor 314 and system memory 317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 310 are generally stored on and accessed via a computer readable medium, such as a hard disk drive (e.g., fixed disk 344), an optical drive (e.g., optical drive 340), a floppy disk unit 337, or other storage medium. Additionally, applications can be in the form of electronic signals modulated in accordance with the application and data communication technology when accessed via network modem 347 or interface 348.

Storage interface 334, as with the other storage interfaces of computer system 310, can connect to a standard computer readable medium for storage and/or retrieval of information, such as a fixed disk drive 344. Fixed disk drive 344 may be a part of computer system 310 or may be separate and accessed through other interface systems. Modem 347 may provide a direct connection to a remote server via a telephone link or to the Internet via an interne service provider (ISP). Network interface 348 may provide a direct connection to a remote server via a direct network link to the Internet via a POP (point of presence). Network interface 348 may provide such connection using wireless techniques, including digital cellular telephone connection, Cellular Digital Packet Data (CDPD) connection, digital satellite data connection or the like.

The operation of a computer system such as that shown in FIG. 9 is readily known in the art and is not discussed in detail in this application. Code for inserting new records into base tables, inserting history records into history tables, etc., to implement the present disclosure can be stored in computer-readable storage media such as one or more of system memory 317, fixed disk 344, optical disk 342, or floppy disk 338. Memory 320 is also used for storing temporary variables or other intermediate information during the execution of instructions by the processor 310. The operating system provided on computer system 310 may be MS-DOSS, MS-WINDOWS®, OS/2®, UNIX®, Linux®, or another known operating system.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method implemented by a database system, the method comprising:
    inserting a record into a first table, wherein the record in the first table comprises a primary key field that stores a primary key, a foreign key field that stores a foreign key, and a first field that stores a first value;
    inserting a record into a first history table, wherein the record in the first history table comprises a field that stores a copy of the primary key, a field that stores a name of the foreign key field, and a field that stores a copy of the foreign key;
    inserting a record into a second table, wherein the record in the second table comprises a primary key field that stores a primary key, and a field that stores second data;
    inserting a record into a second history table, wherein the record in the second history table comprises a field that stores a copy of the second data;
    updating the first value stored in the first field of the record in the first table in response to the database system receiving a first structured query language (SQL) statement from a customer relationship management (CRM) application;
    inserting a first record into the first history table in response to the first SQL statement, wherein the first record in the first history table comprises a field that stores a copy of the primary key of the record in the first table, a field that stores a copy of the first value after it is updated, a field that stores a name of the first field, and a first date field;
    wherein the first date field stores either the date when the first SQL statement was received by the database system, the date of the day that immediately follows the date when the first SQL statement was received by the database system, or a date that was entered into a field of a user interface.

2. The method of claim 1 wherein the record in the first table comprises a second field that stores a second value, and wherein the record in the first history table does not include a copy of the second value.

3. The method of claim 2 further comprising:
    updating the second value stored in the second field of the record in the first table in response to the database system receiving the first SQL statement;
    inserting a second record into the first history table in response to receiving the first SQL statement, wherein the second record in the first history table comprises a field that stores a copy of the primary key of the record in the first table, a field that stores a name of the second field, a field that stores a copy of the second value after it is updated, and a first date field;
    wherein the first date field of the second record in the first history table stores either the date when the first SQL statement was received by the database system or the date of the day that immediately follows the date when the first SQL statement was received by the database system.

4. The method of claim 1 wherein the first history table comprises another record that comprises a field that stores a copy of the primary key of the record in the first table, a field that stores a copy of the first value before it was updated in accordance with the first SQL statement, a start date field, and an end date field, wherein the start date field of the other record in the first history table stores a date that is prior to the date the first SQL statement was received by the database system.

5. The method of claim 4 further comprising an act of updating the end date field of the other record in the first history table with either the date when the first SQL statement was received by the database system or the date of the day immediately before the date when the first SQL statement was received by the database system.

6. The method of claim 1 further comprising:
    updating the updated first value stored in the first field of the record in the first table in response to the database system receiving a second SQL statement from the CRM application;
    updating an end date field of the record in the first table with either the date when the database system received the second SQL statement or the date of the day immediately before the date when the database system received the second SQL statement;
    inserting a second record into the first history table in response to receiving the database system receiving the second SQL statement, wherein the second record in the first history table comprises a field that stores a copy of the primary key of the record in the first table, a field that stores a copy of the updated first value after it is again updated, a start date field, and an end date field;
    wherein the start date field of the second record in the first history table stores either the date when the second SQL statement was received by the database system or the date of the day that immediately follows the date when the second SQL update was received by the database system.

7. The method of claim 2 further comprising:
    updating the second value stored in the second field of the record in the first table in response to the database system receiving a second SQL statement from the CRM application;
    inserting a second record into the first history table in response to receiving the second SQL update, wherein the second record in the first history table comprises a field that stores a copy of the primary key of the record in the first table, a field that stores a copy of the second value after it is updated, a start date field, and an end date field;
    wherein the start date field of the second record in the first history table stores either the date when the second SQL statement was received by the database system, the date of the day that immediately follows the date when the second SQL statement was received by the database system, or a date that was entered into another field.

8. The method of claim 7 wherein the second record in the first history table comprises a field that stores a name of the second field, and wherein the second record in the first history table lacks a copy of the updated first value.

9. The method of claim 1 further comprising:
    inserting a new record into the first table in response to the database system receiving a second SQL statement from the CRM application, wherein the new record comprises a primary key field that stores a primary key, a foreign key field that stores a foreign key, and a second field that stores a value that is set to one of two states;

inserting a second record into the first history table, wherein the second record in the first history table comprises a field that stores a name of the foreign key field of the new record, a field that stores a copy of the foreign key of the new record, a field that stores a copy of the primary key of the new record, a start date field, and an end date field;

wherein the start date field of the second history table record stores either the date when the database system received the second SQL statement, the date of the day that immediately follows the date when the second SQL statement was received by the database system, or a date that was entered into another field.

10. The method of claim 9 further comprising:

toggling the value stored in the second field of the new record in the first table from the first state to the second state in response to the database system receiving a third SQL statement from the CRM application;

updating the end date field of the second record in the first history table with either the date when the database system received the third SQL statement or the date of the day immediately before the date when the database system received the third SQL statement.

11. The method of claim 10 further comprising:

toggling the value stored in the second field of the new record from the second state back to the first state in response to the database system receiving a fourth SQL statement from the CRM application;

inserting a third record into the first history table, wherein the third record in the first history table comprises a field that stores the name of the foreign key field of the new record, a field that stores a copy of the foreign key of the new record, a field that stores a copy of the primary key of the new record, a start date field, and an end date field;

wherein the start date field of the third record in the first history table stores either the date when the database system received the fourth SQL statement or the date of a day that is prior to the date when the database system received the fourth SQL statement.

12. A method performed by a computer system, the method comprising:

generating a structured query language (SQL) statement for inserting a record into a first table, wherein the record comprises a primary key field that stores a primary key, a foreign key field that stores a foreign key, and a first field that stores a first value generating an SQL statement for inserting a record into a first history table, wherein the record in the first history table comprises a field that stores a copy of the primary key, a field that stores a name of the foreign key field, and a field that stores a copy of the foreign key;

generating an SQL statement for inserting a record into a second table, wherein the record inserted into the second table comprises a primary key field that stores a primary key, and a field that stores second data;

generating an SQL statement for inserting a record into a second history table, wherein the record in the second history table comprises a field that stores a copy of the second data;

generating a first SQL statement for updating the first value stored in the first field of the record in the first table;

generating a SQL statement for inserting a first record into the first history table in response to generating the first SQL statement, wherein the first record in the first history table comprises a field that stores a copy of the primary key of the record in the first table, a field that stores a copy of the first value after it is updated, a field that stores a name of the first field, and a first date field;

wherein the first date field stores either the date when the first SQL statement was generated, the date of the day that immediately follows the date when the first SQL statement was generated, or a date that was entered into a field of a user interface.

13. The method of claim 12 wherein the record in the first table comprises a second field that stores a second value, and wherein the first record in the first history table does not include a copy of the second value, and wherein the first SQL statement is configured to update the second value stored in the second field of the record.

14. The method of claim 13 further comprising:

generating a SQL statement for inserting a second record into the first history table in response to generating the first SQL statement, wherein the second record in the first history table comprises a field that stores a copy of the primary key of the record in the first table, a field that stores a name of the second field, a field that stores a copy of the second value after it is updated, and a first date field;

wherein the first date field of the second record in the first history table stores either the date when the first SQL statement was generated or the date of the day that immediately follows the date when the first SQL statement was received by the database system.

15. The method of claim 12 wherein the first history table comprises another record that comprises a field that stores a copy of the primary key of the record in the first table, a field that stores a copy of the first value before it was updated, a start date field, and an end date field, wherein the start date field of the other history record stores a date that is prior to the date the first SQL statement was generated.

16. The method of claim 15 further comprising an act of updating the end date field of the other history record with either the date when the first SQL statement was generated or the date of the day immediately before the date when the first SQL statement was generated.

17. A computer readable memory (CRM) that stores instructions executable by a computer system, wherein the computer system implements a method in response to executing the instructions, the method comprising:

generating a structured query language (SQL) statement for inserting a record into a first table, wherein the record in the first table comprises a primary key field that stores a primary key, a foreign key field that stores a foreign key, and a first field that stores a first value;

generating an SQL statement for inserting a record into a first history table, wherein the record in the first history table comprises a field that stores a copy of the primary key, a field that stores a name of the foreign key field, and a field that stores a copy of the foreign key;

generating an SQL statement for inserting a record into a second table, wherein the record in the second table comprises a primary key field that stores a primary key, and a field that stores second data;

generating an SQL statement for inserting a record into a second history table, wherein the record in the second history table comprises a field that stores a copy of the second data;

generating a first SQL statement for updating the first value stored in the first field of the record in the first table;

generating a SQL statement for inserting a first record into the first history table in response to generating the first SQL statement, wherein the first record in the first history table comprises a field that stores a copy of the primary key of the record in the first table, a field that stores a copy of the first value after it is updated, a field that stores a name of the first field, and a first date field;

wherein the first date field stores either the date when the first SQL statement was generated, the date of the day that immediately follows the date when the first SQL statement was generated, or a date that was entered into a field of a user interface.

18. The CRM of claim 17 wherein the record in the first table comprises a second field that stores a second value, and wherein the first record in the first history table does not include a copy of the second value, and wherein the first SQL statement is configured to update the second value stored in the second field of the record.

19. The CRM of claim 18 wherein the method further comprises:

generating a SQL statement for inserting a second record into the first history table in response to generating the first SQL statement, wherein the second history table record comprises a field that stores a copy of the primary key of the record in the first table, a field that stores a name of the second field, a field that stores a copy of the second value after it is updated, and a first date field;

wherein the first date field of the second record in the first history table stores either the date when the first SQL statement was generated or the date of the day that immediately follows the date when the first SQL statement was received by the database system.

20. The CRM of claim 17 wherein the first history table comprises another record that comprises a field that stores a copy of the primary key of the record in the first table, a field that stores a copy of the first value before it was updated, a start date field, and an end date field, wherein the start date field of the other history table record stores a date that is prior to the date the first SQL statement was generated.

21. The CRM of claim 20 wherein the method further comprises generating another SQL statement for updating the end date field of the other history table record with either the date when the first SQL statement was generated or the date of the day immediately before the date when the first SQL statement was generated.

* * * * *

UNITED STATES PATENT AND TRADEMARK OFFICE
CERTIFICATE OF CORRECTION

PATENT NO. : 8,433,692 B2
APPLICATION NO. : 12/848372
DATED : April 30, 2013
INVENTOR(S) : Jain et al.

Page 1 of 1

It is certified that error appears in the above-identified patent and that said Letters Patent is hereby corrected as shown below:

In the Drawings:

On drawing sheet 7 of 8, in figure 8, Ref. Numeral 110, line 2, delete "relaionship" and insert -- relationship --, therefor.

In the Specification:

In column 1, line 52, delete "M;M" and insert -- M:M --, therefor.

In column 6, line 32, after "TDO" insert -- . --.

In column 8, line 12, delete "the The" and insert -- the --, therefor.

In column 12, line 1, delete "or and" and insert -- and/or --, therefor.

In column 12, line 52, delete "interne" and insert -- internet --, therefor.

In column 13, line 2, delete "MS-DOSS," and insert -- MS-DOS®, --, therefor.

Signed and Sealed this
Tenth Day of September, 2013

Teresa Stanek Rea
*Acting Director of the United States Patent and Trademark Office*